United States Patent [19]
Breckenfelder

[11] 3,973,887

[45] Aug. 10, 1976

[54] APPARATUS FOR PRODUCING NON-FELT LAMINAR ROOFING SHINGLES

[75] Inventor: Ernst G. Breckenfelder, Elmhurst, Ill.

[73] Assignee: U.I.P. Engineered Products Corporation, Elk Grove Village, Ill.

[22] Filed: Jan. 16, 1975

[21] Appl. No.: 541,419

Related U.S. Application Data

[62] Division of Ser. No. 337,636, March 2, 1973, Pat. No. 3,886,021.

[52] U.S. Cl. ............................ 425/101; 425/115; 425/130; 425/373; 425/DIG. 201; 264/213; 156/246
[51] Int. Cl.² ................. B29C 1/04; B29C 15/00; B29D 7/02
[58] Field of Search ............ 425/91, 101, 115, 134, 425/130, 224, 373, DIG. 201; 156/246, 279; 264/212, 213

[56] References Cited
UNITED STATES PATENTS

| | | | |
|---|---|---|---|
| 1,339,327 | 5/1920 | Ford | 156/246 |
| 2,586,275 | 2/1952 | Toulmin, Jr. | 156/246 X |

FOREIGN PATENTS OR APPLICATIONS

| | | | |
|---|---|---|---|
| 853,732 | 10/1952 | Germany | 425/115 |
| 844,810 | 7/1952 | Germany | 425/115 |
| 320,509 | 10/1929 | United Kingdom | 156/246 |

*Primary Examiner*—Robert L. Spicer, Jr.
*Attorney, Agent, or Firm*—Ronald E. Barry

[57] ABSTRACT

A method of producing an asphalt roofing composition as well as a novel roofing composition product is disclosed wherein the usual felt base is eliminated. Layers of flowable, viscous asphalt are applied over a moving belt surface and a fiber glass material is introduced between the two layers. In a preferred form, a release agent is placed between the first layer of asphalt applied onto the moving belt surface so as to afford easy removal of the laminated asphalt composition from the belt. The feltless, laminated roofing composition has the advantage of eliminating the use of the usual saturators associated with felt backing type shingles and at the same time affording the reuse of any scrap material.

8 Claims, 4 Drawing Figures

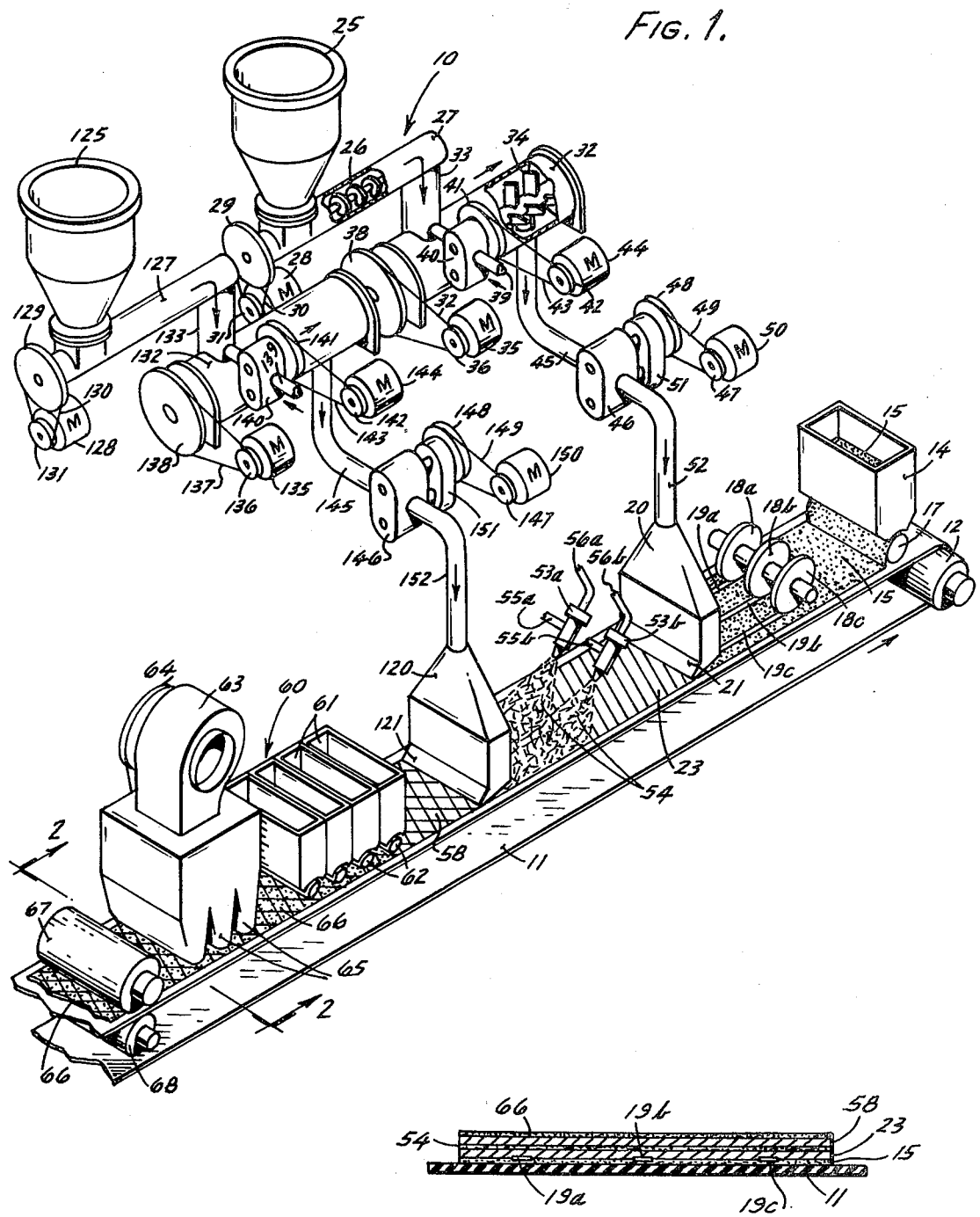

APPARATUS FOR PRODUCING NON-FELT LAMINAR ROOFING SHINGLES

CROSS REFERENCE TO RELATED APPLICATIONS

This application is a division of my parent application Ser. No. 337,636, filed Mar. 2, 1973 and entitled "Process for Making Non-Felt Laminar Roofing Material Such As Composition Shingles and the Like", now U.S. Pat. No. 3,886,021, issued May 27, 1975.

BACKGROUND OF THE INVENTION

This invention relates to the production of roofing materials. More particularly, it relates to a process and roofing composition which is produced without the use of a felt or belt type backing and eliminating the usual problems associated with the felt type shingle production such as the use of saturators which can cause pollution problems and the handling of the felt based backing which can, because of its weakness, break and cause delays.

The most commonly used method in making composition asphalt roofing is to use dry felt paper as a web and carrier to receive the asphalt, filler material and granules. The process requires that this felt be unwound and immersed or sprayed with molten asphalt at 425°–475°F for complete saturation of the felt fibers and to fill the tiny voids in the felt sheet. The surfaces of the saturated felt are then coated with a filled asphalt material such as limestone dust and an asphalt mixture to build up the thickness and weight to various specifications, the most common being 235 lbs./roofing square. Prior to the cooling of this asphalt coating, the granules are dropped and embedded or impressed into the soft molten surface. From this point the sheet is cooled and processed into rolls or shingles of various sizes the most common being known as 12 × 36 square tabs. Such procedures are generally indicated in U.S. Pat. Nos. 2,112,819 and 2,893,889.

The disadvantage of this system of manufacture is the use of dry felt paper which is inherently weak and requires periodic splicing of rolls. The only purpose of the felt is to convey the molten asphalt material through the various processes. Because of its weakness and low tensile strength, it repeatedly breaks causing costly delays in manufacture. This felt requires the initial saturation to make it impervious to moisture and subsequent deterioration. The presently used saturators are large multi-roll machines with large deep tanks for immersing the dry felt into the molten asphalt. Due to the large quantities of asphalt and the circulation there is a great heat lost. Also, asphalt when heated gives off obnoxious fumes when open to the atmosphere. Hooding and fume removing equipment are necessary to get rid of these fumes. Further, the molten asphalt is also a fire and safety hazard.

In U.S. Pat. No. 2,619,675, a manufacturing procedure which does not utilize a felt base is described. However, this process requires the use of an extruder which requires high extruder forces in order to force the asphalt material from the nozzle and precise controls to assure that the extruded sheet is of uniform dimension and is self-supporting.

In the present proposed method and resulting shingle article, the saturator and all attendant equipment is eliminated as dry felt paper would not be used, eliminating splices and breaks. There would be virtually no fumes because the large open volumes of asphalt at high temperatures would be eliminated. Fire hazards now present in a saturator would be foreclosed and the resulting end product would carry a better fire rating as it would not contain dry felt paper. In addition, the present process does not require high extruding forces or precise controls for forming an extruded self-supporting sheet material.

It is an object of the present invention to provide a novel process and roofing composition wherein the usual felt base is no longer employed. It is another object of this invention to provide a process and roofing article wherein the usual saturator employed to make felt type roofing compositions is eliminated. It is still another object of this invention to provide a method and article wherein any scrap material which may result can be easily recycled. It is yet another object of this invention to provide a process for making asphalt roofing composition materials which will afford the application of molten asphalt over a moving belt surface and a material utilized for its removal from the moving belt to be further utilized in orientating cut roofing shingles into stacks for packaging and later use.

SUMMARY OF THE INVENTION

The foregoing objects are accomplished and the shortcomings of the prior art are overcome by the present process and product produced therefrom wherein a first layer of viscous, flowable asphalt is applied onto a supporting surface to effect a first layer of plastic asphalt material with the immediate application of a fibrous material onto the first layer while the first layer is in a plastic self-supporting state. While in this plastic state a second layer of asphalt material is flowed over the fibrous coated first layer to result in a laminated roofing composition material. The usual state granules are applied over the second layer in the normal manner and the resulting product is cooled and removed from the supporting surface. In a preferred manner, the first stripe or layer of asphalt material is applied in a flowable manner using pumping pressures which will allow the liquid asphalt to flow onto a moving belt. A release agent is applied prior to the application of the first layer onto the moving belt and the subsequent layer and fibrous material is applied to this first layer. A filler material is utilized in the flowable asphalt for both layers and it can be the same material as utilized for the release agent. Backing strips are also readily adaptable to the process and can be applied over the release agent prior to the application of the first layer. The temperature of the viscous, flowable asphalt is preferably in the range of 250°–350°F and is applied onto the moving belt as a flowable liquid. After it is applied over the belt, it sets up into a plastic mass having adhesive qualities and permitting the embedding of fiber glass and adherence of the subsequent liquid layer of asphalt. A unique asphalt roofing composition results from this process in that it does not have a felt base yet it is a homogeneous web with the filled asphalt serving as the binder and the fibrous material giving it tensile strength.

BRIEF DESCRIPTION OF THE DRAWINGS

A better understanding of the present process and the article produced thereby will be afforded by reference to the drawings wherein:

FIG. 1 is a perspective view illustrating a portion of the apparatus for carrying out the unique method of this invention.

FIG. 2 is a view in vertical section taken along line 2—2 of FIG. 1.

FIG. 3 is a view in vertical section taken along line 3—3 of FIG. 1a.

DESCRIPTION OF THE METHOD EMBODIMENT

The method of this invention comprises the steps of applying a first layer of viscous, flowable liquid-like asphalt onto a supporting surface to effect a first layer of plastic asphalt material which is self-supporting yet will allow a fibrous material such as fiber glass to be forced onto it. A fibrous material, such as fiber glass is then blown with force into the first layer and while the first layer is in a plastic state and a second layer of liquid, flowable, viscous asphalt material is applied over the first layer with the fibers. While the second layer is in the plastic state slate granules are applied over it and the resulting laminated composition is then cooled and removed from the supporting surface. In a preferred manner, the first layer of liquid, flowable, viscous asphalt is placed in the form of a stripe onto a moving belt surface to which is previously applied a release agent such as limestone dust. The fibrous material which is applied between the two layers is preferably fiber glass and is suitably blown onto the first plastic layer of asphalt by means of fiber glass chopper applicators which are of the gun type. The preferred temperature of the viscous liquid, flowable asphalt is in the range of 250°–350°F and in a like manner the second layer as it is applied is in the same temperature range. The release agent is placed on a moving belt in excess of 100% in the area where the product is to be applied. The first coat would preferably be of 1/16 inch and the fiber glass interjected into it at the rate of 1¼ ounces per 9 square feet. The fiber strands should be controlled to be of a length of approximately 1 inch to 1½ inches and be about 1 mil. thick. The second layer of asphalt material would be of the same width as the first and would be applied to the first layer when it is in a molten plastic and somewhat self-supporting state. The fibrous materials would not lend any thickness to the material but by being fed through a chopper the ends become split giving binding strength. The width of the moving compositioned layers can be of any dimension desired by merely regulating the orifice of the applicator through which the heated asphalt material is caused to flow. The usual granules are then applied over the second layer while it is in a plastic state and the entire resulting product is later cooled, cut and stacked for shipping. The resulting product is in effect a laminar or sandwiched type composition in that two layers of asphalt material will in effect be formed with fiber glass there between and slate granules on the top and with no felt base being employed.

DESCRIPTION OF APPARATUS AND OPERATION FOR EFFECTING METHOD

Figure 1A:
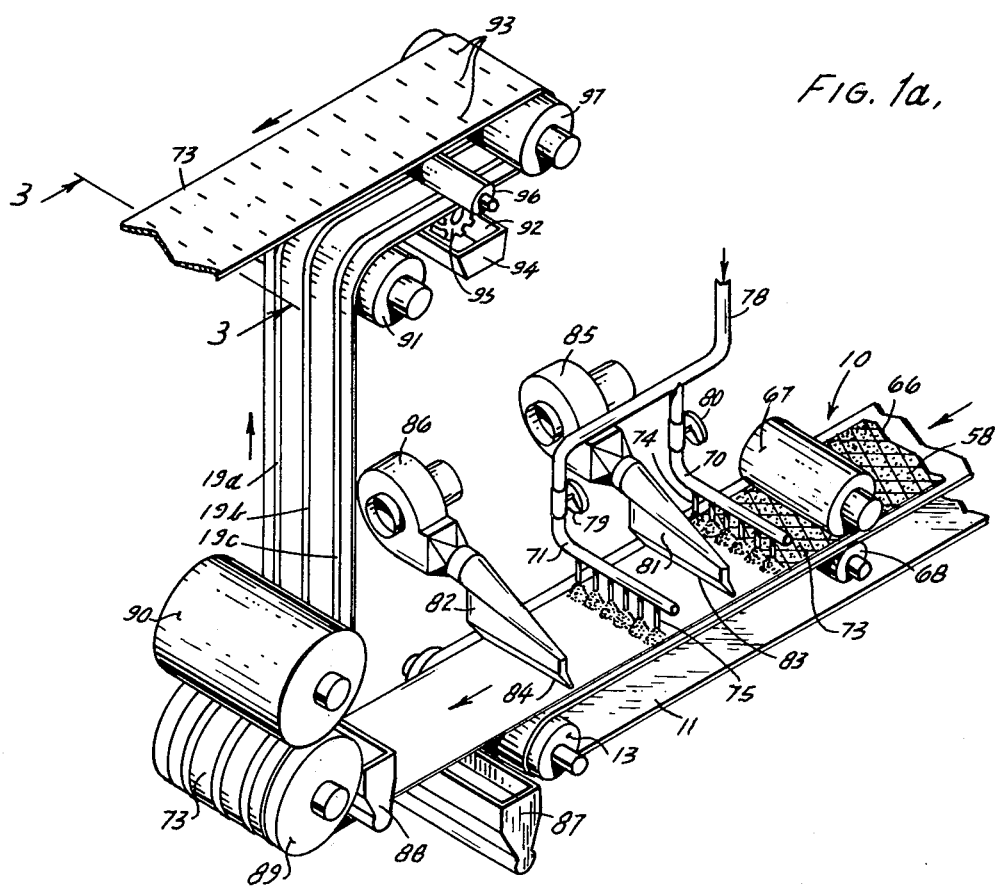
FIG. 1a is a view similar to FIG. 1 except showing a continuation of the apparatus described in FIG. 1.

A better understanding of the method of this invention and the production of the article of this invention will be had by a description of the apparatus described in FIGS. 1 and 1a, generally indicated by the numeral 10, and its operation. A continuous conveyor belt 11 is rotatably supported over and driven by rollers 12 and 13. Belt 11 is composed of fibrous material such as woven cotton. Disposed above belt 11 and adjacent roller 12 is a hopper 14 containing a release agent 15, such as limestone dust, which is fed in a continuous and uniform manner from hopper 14 by means of roller applicator 17 down onto belt 11. Three spools 18a, 18b and 18c have wound thereon silicone treated backing strips 19a, 19b and 19c, respectively, which spools are rotatably mounted over belt 11 and apply backing strips 19a, 19b and 19c, onto the release coated belt 11. A liquid asphalt applicator 20 is disposed across belt 11 with an orifice 21 for applying the first ribbon or stripe of liquid asphalt material which will become plastic and somewhat self-sustaining when it contacts the release agent 15 on belt 11. This is indicated by the numeral 23. Applicator 20 is supplied with filled asphalt material by means of several devices which will now be described:

A filler hopper 25 will contain the filler material such as limestone dust and will flow downwardly through the hopper and be moved laterally from it by means of auger 26 rotatably disposed in tubular conduit 27, with auger 26 being rotated by means of motor 28 which drives clevis 29 secured to auger 26. Clevis 29 is driven by belt 30 which in turn engages motor sheave 31. The filler material will then enter into a continuous mixer 32 by means of intermediate conduit 33. Continuous mixer 33 contains a paddle agitator 34 which will be driven by means of motor 35, motor sheave 36, belt 37 and paddle agitator sheave 38. Continuous mixer 32 is of the heated jacketed variety and heated asphalt at temperature of 350°–400°F is introduced through inlet 39 in pump 40 which is driven by sheaves 41 and 42, interconnected by belt 43 to motor 44. After suitable mixing with the hot asphalt and the filler material, the combined product will flow downwardly through conduit 45 from chamber 32 into pump 346 which is driven by sheaves 47 and 48, interconnected by belt 49 driven by motor 50, with sheave 48 driving transmission 51 for filled coating pump 46. The filled asphalt product will flow down conduit 52 into asphalt applicator 20 and ultimately out orifice 21 to subsequently form first layer of asphalt 23.

Two fiber glass chopping guns 53a and 53b will blow chopped fiber glass 54 onto first layer 23 and will become embedded therein. Both chopping guns 53a and 53b being supplied by the usual fiber glass inlet conduits 55a and 55b and air intakes 56a and 56b. After the chopped fiber glass is blown into the first layer 23 of asphalt material the resulting product will pass beneath a second liquid asphalt applicator 120 which is positioned the same as applicator 20 but spaced therefrom. Applicator 120 is supplied by the same means which function in the same manner and, consequently, all of the components as well as applicator 120 itself are numbered in the "100" series and each will not be repeated. Applicator 120 will flow liquid asphalt out from orifice 121 under the same temperature conditions as that indicated for applicator 20 and orifice 20 to result in a second asphalt layer 58 of a self-supporting plastic consistency which will be moved by means of belt 11 under slate granule blender applicators 60 containing compartments such as 61 for the various types of color granules. These are of the standard variety and will be applied onto the second layer 58 by means of roller applicators 62. After having the granules 66 applied to the second layer 58 belt 11 will move the slate covered two layered composition beneath cooling fan 63 driven in the usual manner by sheave 64 to force air down into cooling chamber 57 and out through the three chambered orifices 65. Positioned immediately downstream from cooling fan 63 are a pair of press rolls 67 and 68 which are rotatably supported on opposite sides of belt 11 with press roll 67 being water cooled for pressing granules 66 into layer 58. Also disposed above belt 11 are pairs of standard water sprayers 70 and 71 which will apply cooling water to the pressed laminar asphalt composition 73 by means of nozzles 74 and 85, respectively, with water sprayers 70 and 71 being in communication with water inlet pipe 78. Valves 79 and 80 control the flow of water to water sprayers 71 and 70 which will be under suitable pressure. Two air blowers 81 and 82 with knife-like orifices 83 and 84 will apply air at high pressures to drive the water from the asphalt composition 73 after each application of water from water sprayers 70 and 71 with the air being suitably forced into the knife-like applicators 83 and 84 by means of blower mechanisms 85 and 86.

A release agent collector hopper 87 is suitably disposed adjacent roller 13 to collect excess release agent 15 and in a similar manner granule collector hopper 88 is positioned adjacent roller 89, with roller 89 and roller 90 being powdered to lift laminar asphalt composition 73 upwardly across the support roller 91 and through a seal down applicator 92. Three rows of adhesive-like asphalt such as indicated at 93 are applied by applicator 92 by means of tray 94 and a dipping applicator wheel such as shown at 95 which is of the cog type to apply the seal down material 93 in a spaced manner. Roller 96 affords the necessary force during application of the adhesive asphalt. After passing from support roller 97 the asphalt laminar product 83 can be cut into various sizes of shingles by punching and wrapping in the usual manner. It will be noted that backing strips 19a, 19b and 19c will be orientated opposite to the three rows of adhesive 93 so as to prevent sticking to the adjacent shingles when they are packaged.

Figure 3:
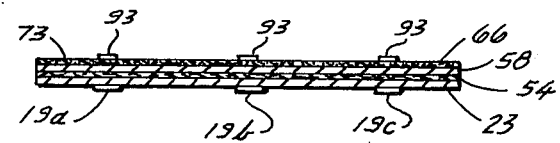

The form of the laminar shingles as they are produced intermediately is shown in FIG. 2 and ultimately in FIG. 3. It will be noted in FIG. 3 that a laminar product 73 is produced with the two layers of asphalt 23 and 58 with fiber glass 54 therebetween and granules 66 at the top with no felt material being employed.

In the previous description of the invention, limestone dust is indicated for the release agent 15 as well as the filler material in filler hopper 25 for mixing with the asphalt which is applied by means of applicators 20 and 120. It should be understood that other materials for the release agent 15 could be employed such as portland cement, talc or mica. Similarly, fly-ash and sand could be utilized in hopper 25 as the filler material. A belt 11 has been referred to for use in fabricating the laminar asphalt composition 73. It should be understood that any conveyor belt which would have a surface which is smooth and resistant to adhesion to asphalt such as stainless steel, Teflon, Delrin and the like which could withstand the temperatures required could be utilized. Chopping guns 53a and 53b are utilized for applying the fiber glass onto the molten asphalt layer 23. These are of the standard Binks type. Any chopper type guns which will blow asphalt fibers onto the molten asphalt material can be substituted.

It will thus be seen that through the present invention there is now afforded a method for producing asphalt composition shingles which completely eliminates the felt type base and its inherent saturators. The method is readily adaptable to a continuous type process and utilizes asphalt material at a reduced temperature so that fumes surrounding production are kept to a minimum while capital investment for equipment is also kept low. The process lends itself readily to automation and any material which should result as scrap can be readily recycled into usable material which in the instance of asphalt felt base material cannot be done. In the instance where a release agent is employed to readily remove the laminar product from the belt this release agent also serves the purpose of allowing the subsequently cut shingled material to be slide over each other in stacking as well as later use during application. The laminar product produced by this invention has suitable tensile strength so as to be comparable in every way to that of the felt base type shingle.

The foregoing invention can now be practised by those skilled in the art. Such skilled persons will know that the invention is not necessarily restricted by the particular embodiments herein. The scope of the invention is to be defined by the terms of the following claims as given meaning by the preceding description.

I claim:

1. An apparatus for producing a laminated roofing shingle, said apparatus comprising:
    a frame,
    an endless belt mounted on said frame,
    means for moving said belt continuously,
    a first liquid asphalt applicator mounted above said belt for applying a first layer of asphalt on said belt,
    a fibrous material chopping gun mounted above said belt for blowing chopped fibrous material into said first layer of asphalt,
    a second liquid asphalt applicator mounted above said belt for applying a second layer of asphalt onto said first layer of asphalt,
    means for cooling said first and second layers of asphalt to form a laminated roofing composition on said belt,
    and means for removing said composition from said belt.

2. The apparatus according to claim 1 including means for applying a release agent to said belt prior to applying of said first layer of asphalt by said first applicator.

3. The apparatus according to claim 1 including a slate granule blender for depositing slate granules onto said second layer of asphalt downstream from said second asphalt applicator.

4. The apparatus according to claim 3 including a blower located downstream from said blender for cooling said asphalt.

5. The apparatus according to claim 3 including a pair of pressure rollers for pressing said slate granules into said second layer of said asphalt.

6. An apparatus for producing a laminated roofing composition, said apparatus comprising:
    a frame,
    an endless belt mounted on said frame,
    means for driving said belt continuously in one direction,
    a hopper located above said belt for depositing a release agent on said belt,
    a number of spools mounted above said belt for applying backing strips onto said belt, a first liquid asphalt applicator disposed across said belt downstream from said spools for depositing a first strip of liquid asphalt onto said belt, a pair of fiber glass chopping guns located downstream from said first liquid asphalt applicator for blowing chopped fiber glass into said first layer of asphalt, a second liquid asphalt applicator disposed across said belt downstream from said chopping guns for depositing a second strip of liquid asphalt onto said first strip of liquid asphalt, and a blower downstream from said second asphalt applicator for cooling said first and second layers of asphalt to form a laminated roofing composition.

7. An apparatus according to claim 6 including:

a slate granule blender disposed across said belt downstream from said second asphalt applicator for selectively depositing colored slate granules onto said second layer of asphalt, and a pair of pressure rollers for pressing said granules into said second layer of asphalt.

8. An apparatus according to claim 7 including a seal-down applicator located downstream from said blower for applying three rows of adhesive-like asphalt to said laminated composition.

* * * * *